US009986368B2

United States Patent
Foti (10) Patent No.: US 9,986,368 B2
(45) Date of Patent: May 29, 2018

(54) LOOP AVOIDANCE IN MIDDLE-NODE-TO-MIDDLE-NODE REGISTRATION IN M2M NETWORKS

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

(21) Appl. No.: 15/300,167

(22) PCT Filed: Mar. 30, 2015

(86) PCT No.: PCT/IB2015/052345
§ 371 (c)(1),
(2) Date: Sep. 28, 2016

(87) PCT Pub. No.: WO2015/151017
PCT Pub. Date: Oct. 8, 2015

(65) Prior Publication Data
US 2017/0180910 A1    Jun. 22, 2017

Related U.S. Application Data

(60) Provisional application No. 61/973,464, filed on Apr. 1, 2014.

(51) Int. Cl.
*H04W 4/00* (2018.01)
*H04W 4/20* (2018.01)
(Continued)

(52) U.S. Cl.
CPC ............ *H04W 4/005* (2013.01); *H04L 67/303* (2013.01); *H04W 4/20* (2013.01); *H04W 8/06* (2013.01)

(58) Field of Classification Search
CPC ......... H04W 4/005; H04W 4/20; H04W 8/06; H04L 67/303
See application file for complete search history.

(56) References Cited

U.S. PATENT DOCUMENTS

2005/0076140 A1    4/2005 Fung et al.

OTHER PUBLICATIONS

Unknow author, "Loop detection in MN to MN Registration", Ericssion, One M2M input Contribution, Mar. 25, 2014.*
(Continued)

*Primary Examiner* — Siming Liu
(74) *Attorney, Agent, or Firm* — Murphy, Bilak & Homiller, PLLC (57) ABSTRACT

A first machine-to-machine, M2M, node registering with a second M2M node avoids registration loops using a method that begins with obtaining (710) identifiers for each M2M node with which the second M2M node is registered. The first M2M node refrains (735) from registering with the second M2M node if an identifier for the first M2M node is among the identifiers, registers (725) with the second M2M if the second M2M node is not registered with other M2M nodes, and otherwise: (a) retrieves (740) identifiers for each M2M node with which any M2M on the obtained list is registered, (b) registers (755) with the second M2M node in the event that no identifiers are retrieved, and, (c) if the identifier for the first M2M node is retrieved, refrains (765) from registering with the second M2M node. Steps (a), (b), and (c) may be repeated for identifiers retrieved in step (a).

19 Claims, 8 Drawing Sheets

(51) Int. Cl.
*H04W 8/06* (2009.01)
*H04L 29/08* (2006.01)

(56) References Cited

OTHER PUBLICATIONS

ETSI, "Machine-to-Machine communications (M2M); Functional architecture", ETSI TS 102 690 V2.1.1, Oct. 2013, 1-332.
Foti, George, "Loop Avoidance in MN to MN Registration", oneM2M-ARC, XP-02742462, Ericsson, Mar. 30, 2014, 1-4.
Unknown, Author, "oneM2M Functional Architecture Baseline Draft", oneM2M-TS-0001—V-0.4.2, XP-0027 42463, Mar. 4, 2014, 1-34.
Unknown, Author, "Manage XMPP entity features", Available online on Jun. 7, 2017 at http://download.igniterealtime.org/smack/docs/latest/documentation/extensions/disco.html, 1-4.
Unknown, Author, "Loop detection in MN to MN Registration", Ericsson, One M2M Input Contribution, Mar. 25, 2014, 1-4.
Unknown, Author, "oneM2M Functional Architecture Baseline Draft", One M2M Technical Specification, oneM2M-TS-0001—V-0.4.2, Mar. 4, 2014, 1-302.

\* cited by examiner

LOOP AVOIDANCE IN MIDDLE-NODE-TO-MIDDLE-NODE REGISTRATION IN M2M NETWORKS

TECHNICAL FIELD

The present disclosure generally relates generally to telecommunications networks that include machine-to-machine (M2M) devices, and more particularly relates to techniques for handling registration among gateways in such networks.

BACKGROUND

In an environment in which machine-to-machine (M2M) devices are connected to an M2M service provider (SP) through an access network provided by another entity, the M2M service provider effectively creates a service layer on top of the access network. This service layer is used to deliver services to the M2M devices. Frameworks for providing M2M services have been developed by the European Telecommunications Standards Institute (ETSI) as well as by an organization known as one2M2M.

Figure 1:
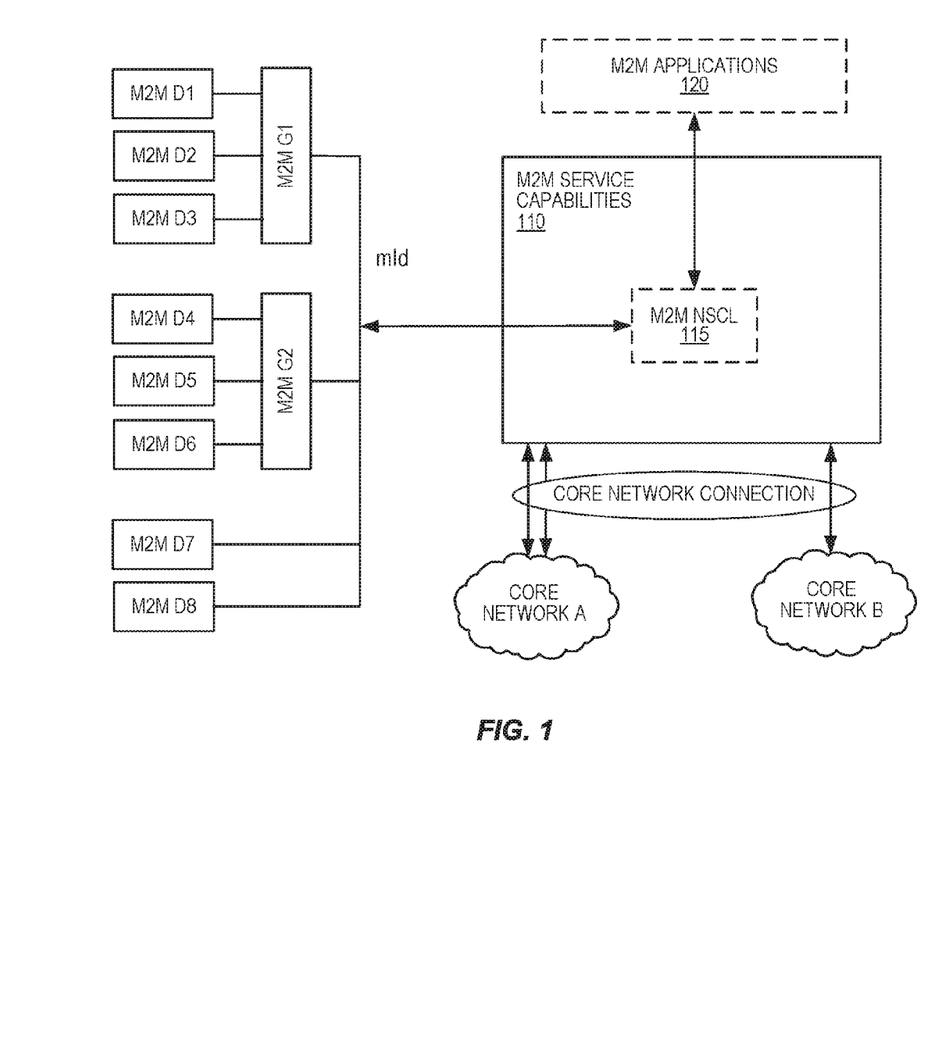
FIG. 1 is a block diagram illustrating features of the M2M architecture as specified by ETSI.

FIG. 1 illustrates the typical architecture of an M2M system as depicted in the ETSI specifications. The illustrated architecture includes an M2M Service Capabilities server 110, which provides at least one M2M Network Services Capabilities Layer (NSCL) 115 for one or more M2M applications 120, which may be implemented on the M2M Services Capabilities server 110 and/or on one or more other server nodes.

A Service Capability Layer (SCL) is an M2M concept standardized by ETSI, and represents an abstraction layer of the M2M software in which common functionalities are implemented to serve M2M applications. The software implementing the NSCL in the M2M server provides a set of application program interfaces (APIs) to expose the M2M service capabilities to the M2M applications. Corresponding SCLs can be found in the M2M device and/or in an M2M Gateway node, and are often referred to as DSCLs and GSCLs, respectively. An instantiation of the SCL is identified by an SCL identifier (SCL-ID) that is maintained by the M2M service provider and pre-configured in the device or acquired during a bootstrap process. Thus, an M2M DSCL in the M2M device corresponds directly to an M2M NSCL 115 in the M2M server 110.

FIG. 1 also illustrates three different types of M2M devices. A first type is devices hidden behind gateways and that are thus not visible to the M2M NSCL, which is the main core network node. In FIG. 1, these devices are labeled M2M D1-M2M D6. A second type is devices not hidden behind gateways and visible to the M2M NSCL. In FIG. 1, these devices are labeled M2M D7 and M2M D8. A third type is gateways visible to the M2M NSCL and handling hidden devices. These gateways are labeled M2M G1 and M2M G2 in FIG. 1.

Note that hidden devices, gateways, and devices visible to the M2M NSCL can each have applications that communicate with the M2M NSCL. However applications on devices hidden behind the gateways can be reached only via the gateway to which they are connected.

More information on the current architecture can be found in the most current version of the ETSI document entitled "machine-to-machine Communication—Functional Architecture," ETSI TS 102 690, which describes in more details the functions and interfaces shown in FIG. 1.

Figure 2:
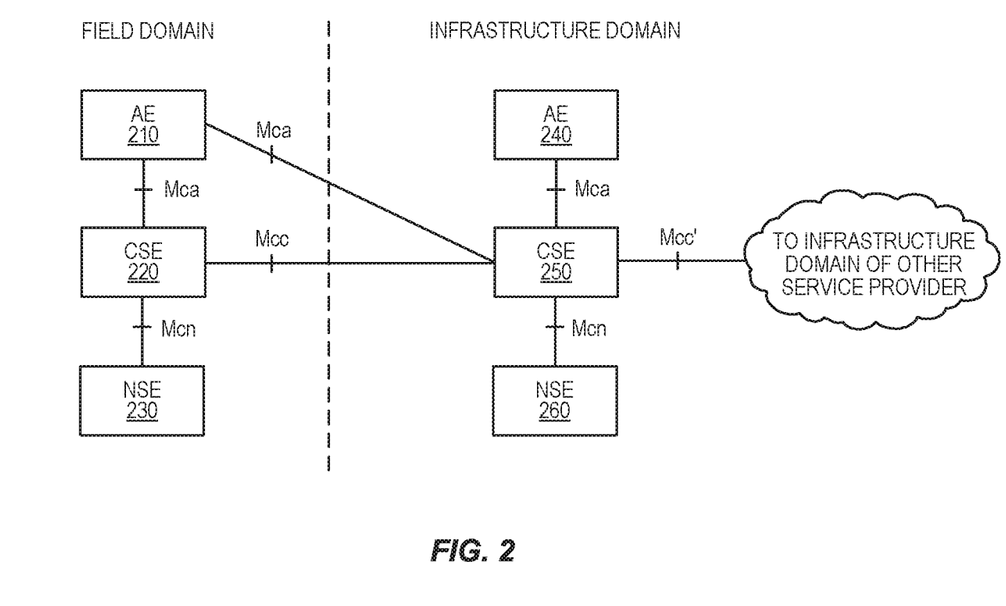
FIG. 2 is a block diagram illustrating features of the M2M architecture as specified by oneM2M.

The oneM2M architecture for M2M systems is similar to the ETSI architecture and is depicted in FIG. 2. According to the oneM2M architecture, an M2M system can be divided into a field domain, in which device gateways and M2M devices reside, and the infrastructure domain, where network-based functions reside. In each domain are application entities (AEs), shown as Field Domain AE 210 and Infrastructure Domain AE 240 in FIG. 2, as well as Common Services Entities (CSEs), shown as Field Domain CSE 220 and Infrastructure Domain CSE 250 in FIG. 2. The AE provides application logic for specific end-to-end M2M solutions, such as for fleet tracking, remote power metering, etc. The CSE includes service functions that are common to the M2M environments and that are specified by oneM2M. These service functions are exposed to other entities through reference points Mca and Mcc. A network services entity (NSE) is also present in each domain, and is represented by NSE 230 and NSE 260 in FIG. 2. The NSE provides services such as device management, location services, and device triggering.

The NSCL in the ETSI architecture is equivalent to the infrastructure domain CSE 250 depicted in FIG. 2. The gateway in the ETSI architecture is equivalent to the field domain CSE 220 in FIG. 1. While ETSI defines only one gateway, oneM2M includes several gateways in its architecture. Further information on the oneM2M architecture can be found at http://www.onem2m.org. Detailed information can be found in the document "oneM2M Functional Architecture," oneM2M-TS-0001-V-0.3.1 (December 2013).

Figure 3:
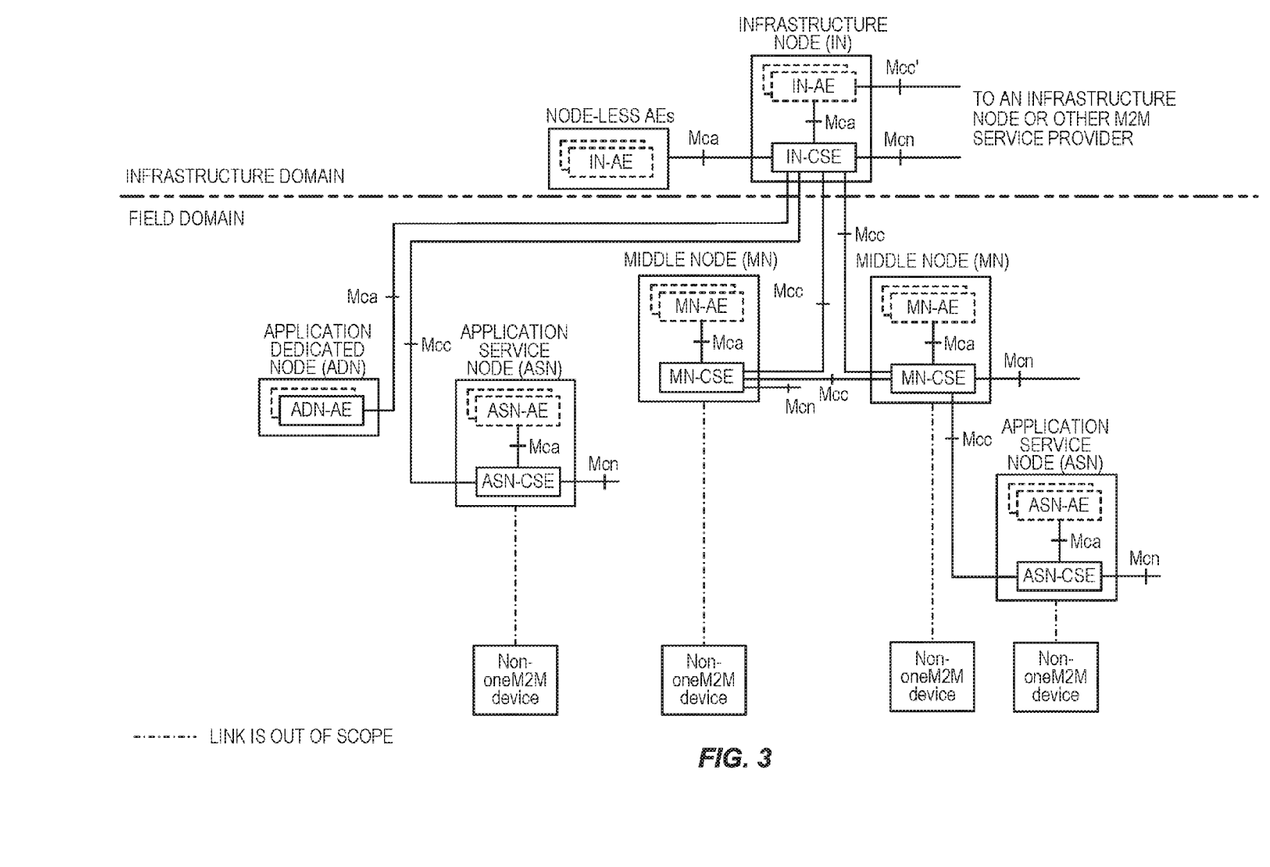
FIG. 3 illustrates several of the nodes that might appear in a typical M2M deployment.

As part of its definition of the M2M architecture, oneM2M has defined several different types of nodes that it foresees as being part of the typical M2M network deployment. FIG. 3 illustrates some of these nodes. From a purely architectural perspective, these nodes are functional/logical objects, and are not necessarily mapped to discrete physical devices, although any of them might be in any particular instance. One of these nodes is referred to as an Infrastructure Node (IN)—the IN resides in the Infrastructure Domain, contains one CSE, and may contain any number (including zero) of AEs. Typically, there would be just one IN in a deployment.

Another node is referred to as a Middle Node (MN)—a MN resides in the Field Domain, contains one CSE, and also may or may not contain one or more AEs. The functional/logical object known as the MN may reside in an M2M Gateway, for example. A MN can communicate with an IN and/or another MN and/or an Application Dedicated Node (ADN), which is a node that contains at least one AE but does not include a CSE.

Before a node can take advantage of services provided by the CSE of another node, it needs to register with that CSE. The M2M framework as currently defined has a limitation in is architecture with respect to MN-to-MN registration. An extract from Section 6.2.9.2 of the working version of the oneM2M Functional Architecture Baseline specification is reproduced below:

> An MN-CSE shall support only a single registration towards another MN-CSE or an IN-CSE. A concatenation (registration chain) of multiple uni-directional registrations shall not form a loop. E.g. Two MN-CSEs A and B, shall not register with each other. Three MN-CSEs A, B and C, where A registers to B, and B registers to C, then C shall not register to A.

Figure 4:
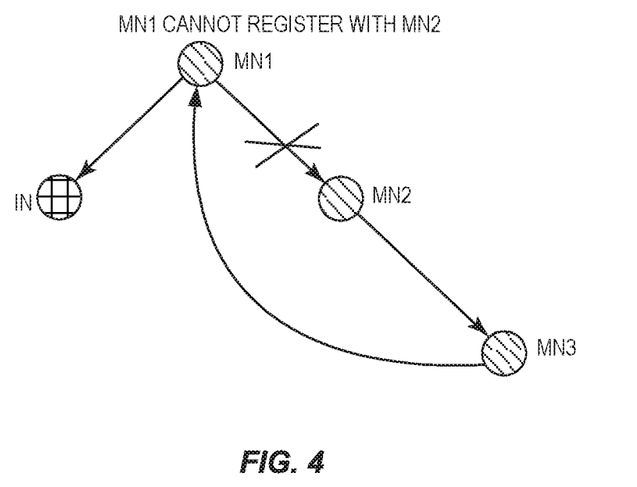
FIG. 4 illustrates an example of restrictions on MN-to-MN registration.

An example of this restriction is shown in FIG. 4. As can be seen in the figure, because MN2 is registered with MN3, which in turn is registered with MN1, MN1 is not allowed to register with MN2, as this would create a loop. Procedures to ensure that this restriction is met are needed.

SUMMARY

Described herein are loop-avoidance procedures that can be undertaken by a machine-to-machine (M2M) node, such as a Middle Node (MN) before it registers with another M2M node, to allow the first M2M node to determine whether its anticipated registration will lead to loop creation and avoid such registrations. While current oneM2M specifications specify that an MN-CSE should support only a single registration towards another MN-CSE, it is possible to allow a MN-CSE to support registrations towards more than one other MN-CSE. Accordingly, the loop avoidance procedures described herein may be employed whether or not an MN is allowed to register with or receive registrations from multiple MNs.

An example method according to the techniques disclosed herein begins with obtaining a list of identifiers for each M2M node with which the second M2M node is registered, if any. In some embodiments, this may comprise sending a message to the second M2M node, the message requesting a list of identifiers for M2M nodes with which the second M2M node is registered, and receiving a response message from the second M2M node, the response message identifying M2M nodes with which the second M2M node is registered or indicating that the second M2M node is not registered with any M2M nodes. In other embodiments, this may instead comprise retrieving profile information, e.g., a profile attribute, for the second M2M node, the profile information identifying M2M nodes with which the second M2M node is registered or indicating that the second M2M node is not registered with any M2M nodes.

If the second M2M node is not registered with any M2M nodes then the first M2M node may register with the second M2M node, after which the process is complete. Otherwise, if an identifier for the first M2M node is in the list obtained from the first node then the first M2M should refrain from registering with the second M2M node, as doing so would create a loop. In this case, the procedure also ends. Otherwise, i.e., if one or more IDs are obtained and none matches the ID for the first M2M node, then the process continues with the retrieving of identifiers for each M2M node with which any M2M on the obtained list is registered, if any. Again, in some embodiments this may comprise sending a message to each M2M node on the obtained list, the message requesting a list of identifiers for M2M nodes with which the M2M node on the obtained list is registered, and receiving a response message from each M2M node on the obtained list, the response messages identifying M2M nodes with which the M2M nodes on the obtained list are registered or indicating that the M2M nodes on the obtained list are not registered with any M2M nodes. In other embodiments, this may instead comprise retrieving profile information for each M2M node on the obtained list, the profile information identifying M2M nodes with which the M2M nodes on the obtained list are registered or indicating that the M2M nodes on the obtained list are not registered with any M2M nodes.

If there are no such identifiers, then the first M2M node may immediately register with the second M2M node. Likewise, if there are identifiers, and if they include the identifier for the first M2M node, then the first M2M node should refrain from registering with the second M2M node, and the process is terminated.

In some embodiments, if one or more IDs are retrieved and none matches the ID for the first M2M node, then the process may repeat, with the retrieving of identifiers for each M2M node with which any M2M node among the previously retrieved identifiers is registered. In some embodiments, the process will repeat only so long as a maximum depth/length of concatenated registrations does not exceed a predetermined limit. In these embodiments, the first M2M node refrains from registering with the second M2M node in the event that registering with the M2M node will create a concatenation of node-to-node registrations that exceeds a predetermined limit.

In some embodiments of the method summarized above, and its variants, each M2M node is an implementation of a Middle Node (MN) as defined by oneM2M specifications. However, the process summarized above may be adapted to similar nodes having different names, as well as to other types of nodes in other networks. Also, it may be appreciated that the illustrated techniques may be applied so that only nodes of certain types are considered—for example, the node identifiers used in any of the operations described above may be restricted to only Middle Node identifiers, in some embodiments, while including both Middle Node identifiers and Infrastructure Node identifiers in others.

The various M2M nodes described above can each be implemented through the use of a processor operatively connected to a memory storing instructions that cause the processor to carry out the techniques summarized above. Communication with other nodes can be managed through the use of a network interface. In a logical mapping, engines and processors can be used for individual steps and functions to create a logical instance of a node.

Further details of the methods and apparatus described above, as well as variants thereof, are provided in the detailed description that follows.

BRIEF DESCRIPTION OF THE DRAWINGS

Embodiments of the present techniques will now be described, by way of example only, with reference to the attached figures, wherein.

DETAILED DESCRIPTION

In the discussion that follows, reference may be made below to specific elements, numbered in accordance with the attached figures. The discussion below should be taken to be exemplary in nature, and not as limiting the scope of the presently described techniques, which is defined in the claims and should not be considered as limited by the implementation details described below, which as one skilled in the art will appreciate, can be modified by replacing elements with equivalent functional elements.

This document uses the term "M2M node," which is sometimes used by those skilled in the art to refer to a logical entity, as opposed to a physical entity. Of course, in practice this logical entity is embodied in a physical device. Accordingly, as used herein, the term "M2M node" should be understood to refer to the logical entity as embodied in a physical device, such as an M2M Gateway device.

Figure 5:
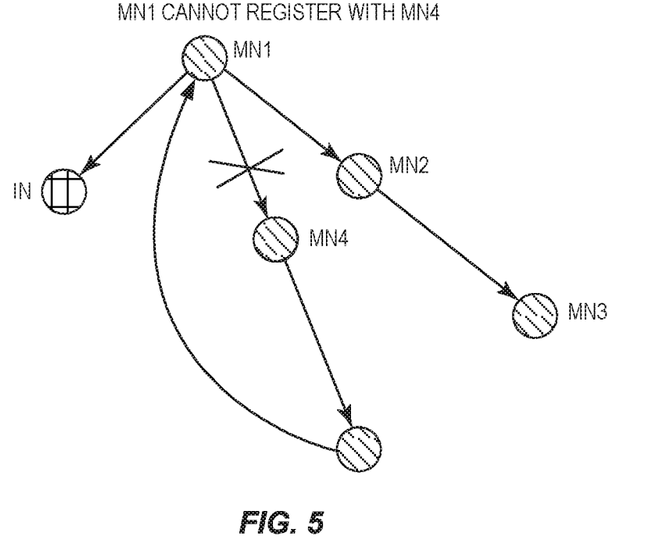
FIG. 5 illustrates another example of restrictions on MN-to-MN registration.

As discussed above, the current specifications for the M2M architecture impose a restriction on registrations among MN-CSEs—namely, that a concatenation (registration chain) of multiple uni-directional registrations shall not form a loop. One example of this restriction was shown in FIG. 4. Another is shown in FIG. 5. In the scenario shown in FIG. 5, because MN4 is registered with MN5, which in turn is registered with MN1, MN1 cannot register with MN4, as that would allow a loop.

Described below are several loop-avoidance procedures that can be undertaken by a MN before it registers with another MN, to allow the first MN to determine whether its anticipated registration will lead to loop creation and avoid such registrations. It should be noted that current oneM2M specifications specify that an MN-CSE should support only a single registration towards another MN-CSE. From a practical standpoint, however, it is possible to allow a MN-CSE to support registrations towards more than one other MN-CSE. Accordingly, the loop avoidance procedures described herein may be employed whether or not an MN is allowed to register with or receive registrations from multiple MNs.

According to a first approach for avoiding registration loops, a new probe message is introduced. This probe message, which is sent by a first MN that wishes to register with another MSN, requires the MN receiving the message to return, in a probe message response, the CSE-ID of each MN with which the receiving MN node is currently registered.

A procedure employed by the MN that wants to register for services (referred to herein as a "Registree," for simplicity) with another MN (referred to herein as a "Registrar") can proceed as follows:

(a) First, the Registree inserts the CSE identifier (CSE-ID) for the Registrar in a yet-to-be-checked-CSE stack. In general, this stack need not be subsequently processed in any particular order. Of course, at this initial stage there is only a single CSE-ID in the yet-to-be-checked-CSE stack.

(b) The following sub-procedure is performed for each CSE-ID remaining in the yet-to-be-checked-CSE stack:

(i) The Registree extracts a CSE-ID from the yet-to-be-checked-CSE stack. If there are no more CSE-IDs when this step is initiated, then the Registree can register with the Registrar.

(ii) The Registree sends a probe message to the CSE corresponding to the extracted CSE-ID.

(iii) The CSE that receives the probe message returns a probe message response, which includes a list of MN CSE-IDs with which the receiving CSE is registered.

(iv) If there are no CSE-IDs returned in the response, the Registree returns to step (i) above, to process another CSE-ID in the yet-to-be-checked-CSE stack. If there are no more CSE-IDs in the stack at this point, the Registree may register with the Registrar.

(v) Otherwise, i.e., if there is at least one CSE-ID returned in the response, the Registree needs to send a probe message to each CSE-ID included in the response. Thus, it places the CSE-IDs included in the response in the yet-to-be-checked-CSE stack, and returns to step (i) above. Note that in some embodiments, the procedure can be limited to a particular number of levels, i.e., to a particular length of concatenated registrations. In these embodiments, if the Registree has reached the limit, it can decide to abandon the registration. Otherwise, if the maximum depth has not been reached (or if there is no limit), then the CSE-IDs included in the probe message response(s) are included in the yet-to-be-checked CSE, as just described, and the procedure returns to step (b)(i).

Figure 6:
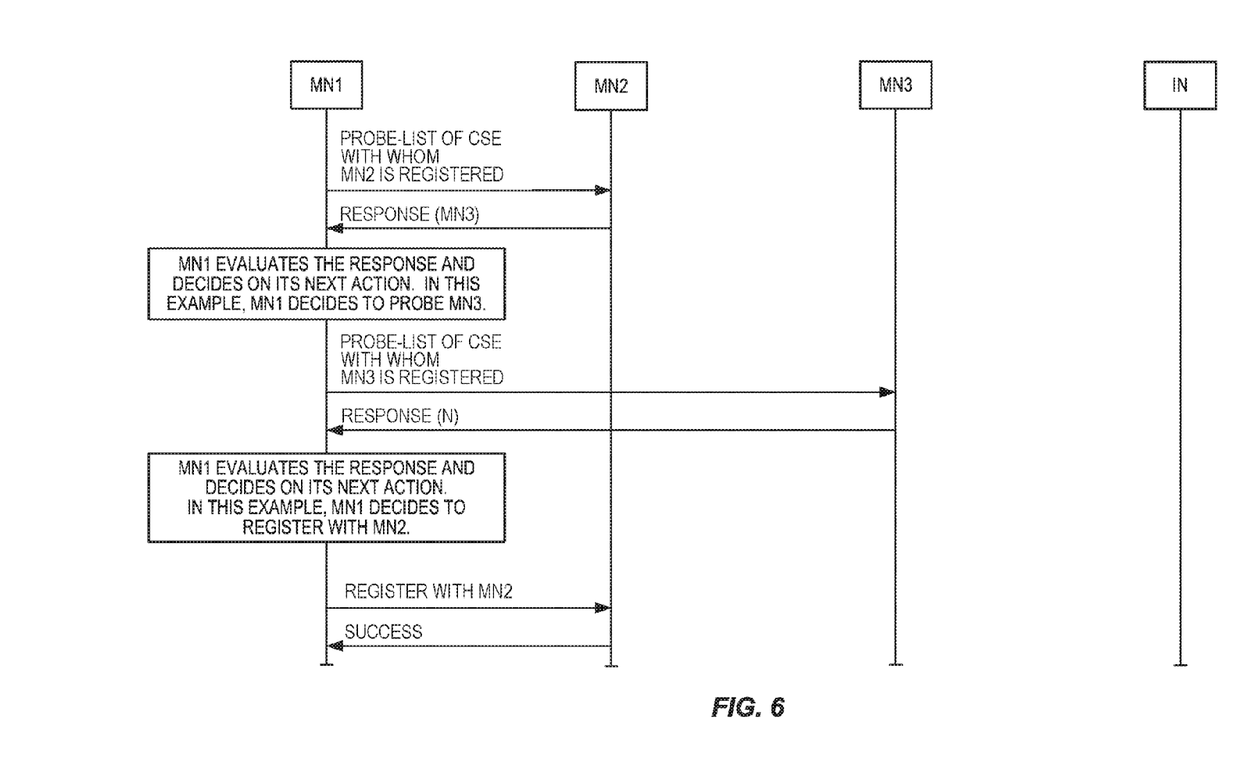
FIG. 6 is a signaling flow diagram illustrating example signaling according to the presently disclosed techniques.

An example signal flow depicting the above is shown in FIG. 6. In the illustrated scenario, MN1 wishes to register with MN2, so it sends a probe message to MN2 requesting a list of CSE-IDs with which MN2 is registered. MN2 responds with a probe message response that includes an indication that MN2 is registered with MN3. MN1 evaluates the response and decides on its next action. In this example, MN1 decides to probe MN3, and thus sends a probe message to MN3, requesting a list of CSE-IDs with which MN3 is registered.

MN3 responds with a "null" indicator, which indicates that MN3 is not registered with any other MNs. MN1 evaluates the response and decides on its next action. At this point, MN1 can decide to register with MN2, as it is now certain that no loops will be created with this registration. Accordingly, MN1 subsequently registers with MN2.

In a variant of the above approach, the probe message sent to any given MN can be replaced by the retrieval of a "Node Resource" for that MN, where the "Node Resource," which is stored in the MN, constitutes a profile for the MN. This approach requires that the Node Resource include a new attribute that identifies the CSE-ID (or CSE-IDs) with which the MN is registered. Each time a MN registers with another MN (a target MN), the Node Resource of the registering MN is updated with the CSE-ID of the target MN. Note that The Node Resource is located in the MN under the so called CSEBase, which is the root for all resources held by the MN. These resources include, among other things, the Node Resource, registered applications, created groups, etc. The tree structure under the root includes the various resources that are standardized by one M2M—the Node Resource is one of those resources, but the specifications for this resource would need to be extended to support loop detection according to this variant of the loop detection procedures described herein.

Subject to access control restrictions, the Node Resource for any given MN can be read by other MNs. Thus, instead of sending a probe message to an MN to determine the CSE-IDs with which that MN is registered, a Registree can retrieve the new attribute from the Node Resource for that MN. This new attribute contains the same information described above for the probe message response—thus, retrieving a Node Resource containing this new attribute can be substituted for the sending of the probe message in the above-described process for loop avoidance.

Figure 7:
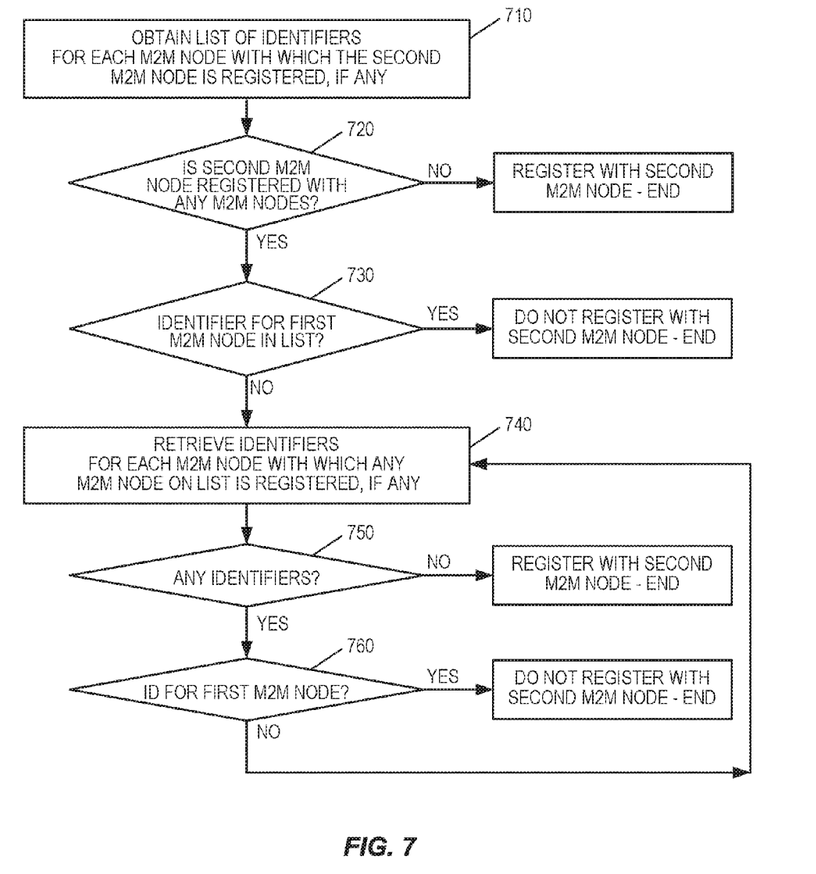
FIG. 7 is a process flow diagram illustrating an example method according to one or more embodiments described herein.

In view of the example techniques described in detail above, it will be appreciated that the process flow diagram of FIG. 7 illustrates a generalized method for avoiding loops in node-to-node registrations, as might be carried out by a first M2M node that wishes to register with a second M2M node. Note that the "registering" and "registrations" referred to in FIG. 7 and in the following discussion are not necessarily limited to MN node-to-node registrations, but should be understood to refer more generally to messages and associated procedures for initiating contact with a node for the purpose of subsequently receiving services from that node. In different contexts, the details of the registration process may vary. In some embodiments, for example, only a simple identification of the registering node sent to the target node is needed, while in other cases more elaborate authentication, access control, and/or handshaking procedures may be needed.

As shown at block 710, the example process illustrated in FIG. 7 begins with obtaining a list of identifiers for each M2M node with which the second M2M node is registered, if any. As discussed above, in some embodiments this may comprise sending a message to the second M2M node, the message requesting a list of identifiers for M2M nodes with which the second M2M node is registered, and receiving a response message from the second M2M node, the response message identifying M2M nodes with which the second M2M node is registered or indicating that the second M2M node is not registered with any M2M nodes. In other embodiments, this may instead comprise retrieving profile information, e.g., a profile attribute, for the second M2M node, the profile information identifying M2M nodes with which the second M2M node is registered or indicating that the second M2M node is not registered with any M2M nodes.

As shown at blocks 720 and 725, if the second M2M node is not registered with any M2M nodes then the first M2M node may register with the second M2M node, after which the process is complete. Otherwise, as shown at blocks 730 and 735, if an identifier for the first M2M node is in the list obtained from the first node then the first M2M should refrain from registering with the second M2M node, as doing so would create a loop. In this case, the procedure also ends.

Otherwise, i.e., if one or more IDs are obtained and none matches the ID for the first M2M node, then the process continues, as shown at block 740, with retrieving identifiers for each M2M node with which any M2M on the obtained list is registered, if any. Just as discussed above, in some embodiments this may comprise sending a message to each M2M node on the obtained list, the message requesting a list of identifiers for M2M nodes with which the M2M node on the obtained list is registered, and receiving a response message from each M2M node on the obtained list, the response messages identifying M2M nodes with which the M2M nodes on the obtained list are registered or indicating that the M2M nodes on the obtained list are not registered with any M2M nodes. In other embodiments, this may instead comprise retrieving profile information for each M2M node on the obtained list, the profile information identifying M2M nodes with which the M2M nodes on the obtained list are registered or indicating that the M2M nodes on the obtained list are not registered with any M2M nodes.

Again, as shown at blocks 750 and 755, if there are no such identifiers, then the first M2M node may immediately register with the second M2M node. Likewise, if there are identifiers, and if they include the identifier for the first M2M node, as indicated at blocks 760 and 765, then the first M2M node should refrain from registering with the second M2M node, and the process is terminated. Otherwise, i.e., if one or more IDs are retrieved and none matches the ID for the first M2M node, then the process repeats, as indicated in the figure, with the retrieving of identifiers for each M2M node with which any M2M node among the previously retrieved identifiers is registered.

Although not shown in FIG. 7, in some embodiments, the process will repeat only so long as a maximum depth/length of concatenated registrations does not exceed a predetermined limit. In these embodiments, the first M2M node refrains from registering with the second M2M node in the event that registering with the M2M node will create a concatenation of node-to-node registrations that exceeds a predetermined limit.

In some embodiments of the method illustrated in FIG. 7, and its variants, each M2M node is an implementation of a Middle Node (MN) as defined by oneM2M specifications. However, the process shown in FIG. 7 may be adapted to similar nodes having different names, as well as to other types of nodes in other networks. Also, it may be appreciated that the illustrated techniques may be applied so that only nodes of certain types are considered—for example, the node identifiers used in any of the operations described above may be restricted to only Middle Node identifiers, in some embodiments, while including both Middle Node identifiers and Infrastructure Node identifiers in others.

The various M2M nodes described above can each be implemented through the use of a processor operatively connected to a memory storing instructions that cause the processor to carry out the techniques described above, including those illustrated in FIG. 7. Communication with other nodes can be managed through the use of a network interface. In a logical mapping, engines and processors can be used for individual steps and functions to create a logical instance of a node.

Figure 8:
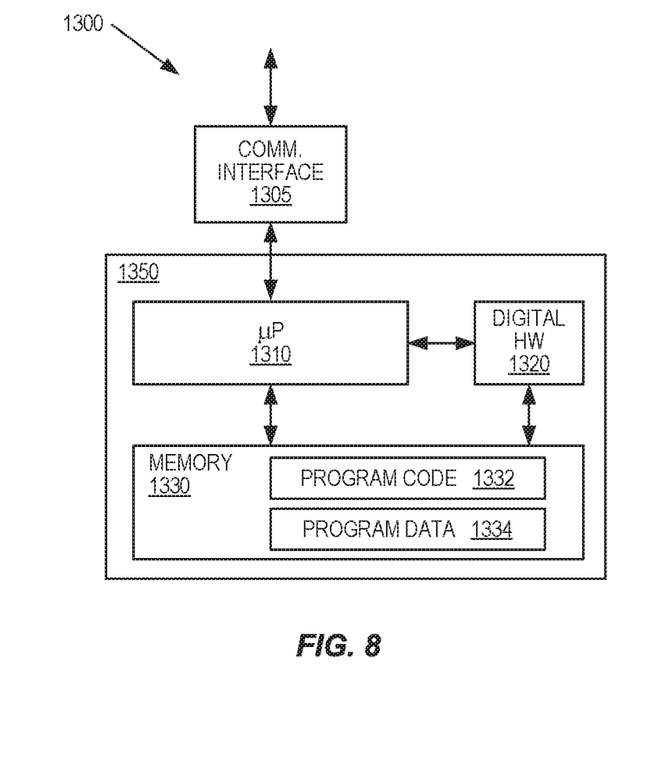
FIG. 8 is a block diagram illustrating components of a device incorporating an M2M node, according to some embodiments.

FIG. 8, for instance, introduces an example M2M node apparatus 1300, which may be adapted to implement all or part of the process illustrated in FIG. 7, the signaling flow of FIG. 6, and/or variations of that method and that signaling flow. In the illustrated example, the infrastructure node comprises a communication interface circuit 1305 that is configured to communicate with one or more other network nodes and/or with one or more M2M devices, e.g., via an access node. It will be understood that the communication interface 1305 actually may comprise multiple interfaces, and may interface to more than one physical layer and/or may support a number of signaling protocols and interface types for communicating with multiple types of other nodes.

The infrastructure node 1300 further includes a processing circuit 1350 that is operatively associated with the communication interface 1305. For example, the processing circuit 1350 comprises one or more CPUs 1310 or other digital processing circuitry 1320 that includes or is associated with a computer-readable memory, such as program and data memory or other memory 1330. The memory 1330 holds program code 1332 and program data 1334, among other things. Processing circuit 1350 may further include other digital HW 1320.

Memory 1330, which may comprise non-volatile memory, may store node identifiers, such as CSE-IDs, in some embodiments, and may further store identifiers for one or more CSE-IDs with which the node is registered.

In several embodiments, the processing circuit 1350 in infrastructure node 1300 is adapted (e.g., with suitable program code stored in program and data memory or storage 1330) to carry out all or parts of the method illustrated in FIG. 7, and variants thereof. More particularly, the processing circuit 1350 in some embodiments is configured to obtain a list of identifiers for each M2M node with which the second M2M node is registered, if any, and to refrain from registering with the second M2M node if an identifier corresponding to the M2M node apparatus is in the obtained list, and register with the second M2M if the second M2M node is not registered with any other M2M nodes. Otherwise, the processing circuit (a) retrieves identifiers for each M2M node with which any M2M on the obtained list is registered, if any; (b) registers with the second M2M node in the event that no identifiers are retrieved; and, (c) in the event that the identifier corresponding to the M2M node apparatus is retrieved, refrains from registering with the second M2M node and terminates the method.

Figure 9:
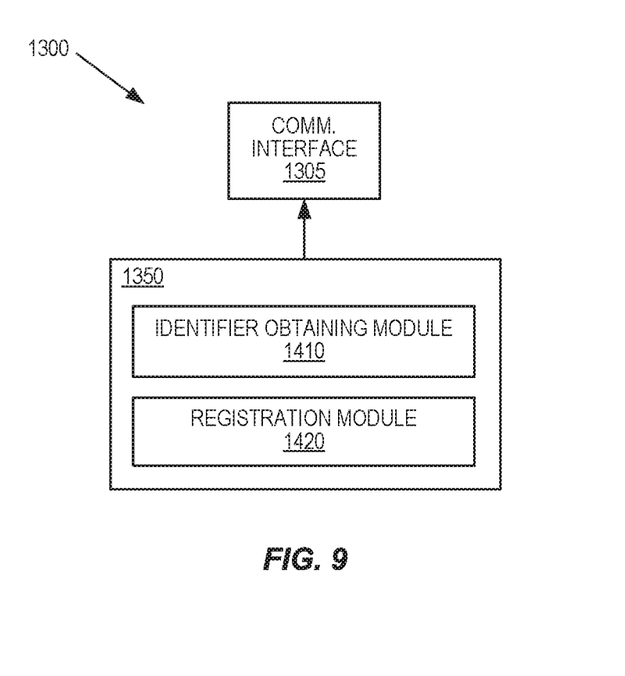
FIG. 9 is a block diagram illustrating functional elements of a device incorporating an M2M node, according to some embodiments.

It will be appreciated that the processing circuit 1350, as adapted with program code stored in program and data memory 1330, can implement the process flow of FIG. 7 (or a variant thereof) using an arrangement of functional "modules," where the modules are computer programs or portions of computer programs executing on the processor circuit 1310. Thus, the apparatus 1300 can be understood as comprising a communications interface 1305 configured to communicate with one or more other nodes in an M2M network, and further comprising several functional modules implemented in processing and control circuits 1350, the functional modules each being arranged to carry out one or more of the operations detailed above. FIG. 9 thus illustrates an alternative view of infrastructure node 1300, comprising the communication interface 1305 and the processing circuit 1350, but with the details of processing circuit 1350 represented by several functional modules. These functional modules comprise an identifier obtaining module 1410, which is configured to obtain a list of identifiers for each M2M node with which the second M2M node is registered, if any, and a registration module 1420. The registration module 1420 is configured to: refrain from registering with the second M2M node if an identifier for the first M2M node is in the obtained list, register with the second M2M if the second M2M node is not registered with any other M2M nodes, and otherwise: (a) retrieve identifiers for each M2M node with which any M2M on the obtained list is registered, if any; (b) register with the second M2M node in the event that no identifiers are retrieved; and, (c) in the event that the identifier for the first M2M node is retrieved, refrain from registering with the second M2M node and terminate the process.

As can be seen from the detailed description of FIG. 8, embodiments of the techniques presented herein may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described techniques may also be stored on the machine-readable medium. Software running from the machine-readable medium may interface with circuitry to perform the described tasks.

The above-described embodiments of the present techniques are intended to be examples only. Alterations, modifications and variations may be effected to the particular embodiments by those of skill in the art without departing from the scope of the present techniques. With these and other variations and extensions in mind, those skilled in the art will appreciate that the foregoing description and the accompanying drawings represent non-limiting examples of the systems and apparatus taught herein. As such, the present techniques are not limited by the foregoing description and accompanying drawings.

What is claimed is:

1. A method, in a first machine-to-machine (M2M) node that wishes to register with a second M2M node to obtain services, for avoiding loops in node-to-node registrations, the method comprising:
   obtaining a list of identifiers for each M2M node with which the second M2M node is registered, if any;
   refraining from registering with the second M2M node if an identifier for the first M2M node is in the obtained list, registering with the second M2M node if the second M2M node is not registered with any other M2M nodes, and otherwise:
   (a) retrieving identifiers for each M2M node with which any M2M node on the obtained list is registered, if any;
   (b) registering with the second M2M node in the event that no identifiers are retrieved; and
   (c) in the event that the identifier for the first M2M node is retrieved, refraining from registering with the second M2M node.

2. The method of claim 1, further comprising, in the event that one or more identifiers are retrieved in step (a), repeating steps (a), (b), and (c) for each of the retrieved identifiers.

3. The method of claim 1, further comprising, in the event of registering with the second M2M node, updating a stored profile for the first M2M node by adding an identifier for the second M2M node to the stored profile.

4. The method of claim 1, further comprising refraining from registering with the second M2M node in the event that registering with the M2M node will create a concatenation of node-to-node registrations that exceeds a predetermined limit.

5. The method of claim 1, wherein said obtaining a list of identifiers comprises:
   sending a message to the second M2M node, the message requesting a list of identifiers for M2M nodes with which the second M2M node is registered; and
   receiving a response message from the second M2M node, the response message identifying M2M nodes with which the second M2M node is registered or indicating that the second M2M node is not registered with any M2M nodes.

6. The method of claim 1, wherein said retrieving identifiers for each M2M node with which any M2M node on the obtained list is registered comprises:
   sending a message to each M2M node on the obtained list, the message requesting a list of identifiers for M2M nodes with which the M2M node on the obtained list is registered; and
   receiving a response message from each M2M node on the obtained list, the response messages identifying M2M nodes with which the M2M nodes on the obtained list are registered or indicating that the M2M nodes on the obtained list are not registered with any M2M nodes.

7. The method of claim 1, wherein said obtaining a list of identifiers comprises retrieving profile information for the second M2M node, the profile information identifying M2M nodes with which the second M2M node is registered or indicating that the second M2M node is not registered with any M2M nodes.

8. The method of claim 1, wherein said retrieving identifiers for each M2M node with which any M2M on the obtained list is registered comprises retrieving profile information for each M2M node on the obtained list, the profile information identifying M2M nodes with which the M2M nodes on the obtained list are registered or indicating that the M2M nodes on the obtained list are not registered with any M2M nodes.

9. The method of claim 1, where each M2M node is an implementation of a Middle Node (MN) as defined by oneM2M specifications.

10. A machine-to-machine (M2M) node apparatus adapted to register with a second M2M node to obtain services, the M2M node apparatus comprising a communications interface configured to communicate with one or more other M2M nodes, and further comprising a processing circuit configured to:
   obtain a list of identifiers for each M2M node with which the second M2M node is registered, if any;
   refrain from registering with the second M2M node if an identifier corresponding to the M2M node apparatus is in the obtained list, registering with the second M2M node if the second M2M node is not registered with any other M2M nodes, and otherwise:
      (a) retrieve identifiers for each M2M node with which any M2M node on the obtained list is registered, if any;
      (b) register with the second M2M node in the event that no identifiers are retrieved; and,
      (c) in the event that the identifier corresponding to the M2M node apparatus is retrieved, refrain from registering with the second M2M node.

11. The M2M node apparatus of claim 10, wherein the processing circuit is further configured to, in the event that one or more identifiers are retrieved in step (a), repeat steps (a), (b), and (c) for each of the retrieved identifiers.

12. The M2M node apparatus of claim 10, wherein the processing circuit is further configured to, in the event of registering with the second M2M node, update a stored profile for the first M2M node by adding an identifier for the second M2M node to the stored profile.

13. The M2M node apparatus of claim 10, wherein the processing circuit is further configured to refrain from registering with the second M2M node in the event that registering with the M2M node will create a concatenation of node-to-node registrations that exceeds a predetermined limit.

14. The M2M node apparatus of claim 10, wherein the processing circuit is configured to obtain the list of identifiers by:
   sending a message to the second M2M node, the message requesting a list of identifiers for M2M nodes with which the second M2M node is registered; and
   receiving a response message from the second M2M node, the response message identifying M2M nodes with which the second M2M node is registered or indicating that the second M2M node is not registered with any M2M nodes.

15. The M2M node apparatus of claim 10, wherein the processing circuit is configured to retrieve identifiers for each M2M node with which any M2M node on the obtained list is registered by:
   sending a message to each M2M node on the obtained list, the message requesting a list of identifiers for M2M nodes with which the M2M node on the obtained list is registered; and
   receiving a response message from each M2M node on the obtained list, the response messages identifying M2M nodes with which the M2M nodes on the obtained list are registered or indicating that the M2M nodes on the obtained list are not registered with any M2M nodes.

16. The M2M node apparatus of claim 10, wherein the processing circuit is configured to obtain the list of identifiers by retrieving profile information for the second M2M node, the profile information identifying M2M nodes with which the second M2M node is registered or indicating that the second M2M node is not registered with any M2M nodes.

17. The M2M node apparatus of claim 10, wherein the processing circuit is configured to retrieve identifiers for each M2M node with which any M2M node on the obtained list is registered by retrieving profile information for each M2M node on the obtained list, the profile information identifying M2M nodes with which the M2M nodes on the obtained list are registered or indicating that the M2M nodes on the obtained list are not registered with any M2M nodes.

18. The M2M node apparatus of claim 10, where each M2M node is an implementation of a Middle Node (MN) as defined by oneM2M specifications.

19. A non-transitory computer-readable medium comprising, stored thereupon, a computer program product comprising program instructions configured for execution by a processor in a machine-to-machine (M2M) node that wishes to register with a second M2M node to obtain services, for avoiding loops in node-to-node registrations, wherein the program instructions are configured so that the program instructions, when executed by the processor, cause the M2M node to:
   obtain a list of identifiers for each M2M node with which the second M2M node is registered, if any;
   refrain from registering with the second M2M node if an identifier for the first M2M node is in the obtained list, register with the second M2M node if the second M2M node is not registered with any other M2M nodes, and otherwise:
      (a) retrieve identifiers for each M2M node with which any M2M node on the obtained list is registered, if any;
      (b) register with the second M2M node in the event that no identifiers are retrieved; and
      (c) in the event that the identifier for the first M2M node is retrieved, refrain from registering with the second M2M node.

* * * * *